US007949686B2

(12) United States Patent
Chang et al.

(10) Patent No.: US 7,949,686 B2
(45) Date of Patent: May 24, 2011

(54) METHOD AND APPARATUS FOR SCALABLE TRANSPORT PROCESSING FULFILLMENT SYSTEM

(75) Inventors: Alvin Kai-Hau Chang, Oakland, CA (US); Simon Wing-Lok Hui, Redwood City, CA (US); Yulia Groza, Pacifica, CA (US); Nathaniel D. Harward, San Francisco, CA (US); Steven S. Chen, Union City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 12/896,990

(22) Filed: Oct. 4, 2010

(65) Prior Publication Data

US 2011/0022672 A1    Jan. 27, 2011

Related U.S. Application Data

(63) Continuation of application No. 10/830,614, filed on Apr. 23, 2004, now Pat. No. 7,822,779.

(51) Int. Cl.
*G06F 17/30* (2006.01)
*G06F 7/00* (2006.01)

(52) U.S. Cl. ....................................... 707/802

(58) Field of Classification Search ............... None
See application file for complete search history.

(56) References Cited

U.S. PATENT DOCUMENTS

| 5,819,261 | A * | 10/1998 | Takahashi et al. ........ 707/3 |
| 5,911,065 | A * | 6/1999 | Williams et al. .......... 718/107 |
| 6,601,067 | B1 * | 7/2003 | Hiyoshi .................... 707/7 |
| 6,640,249 | B1 * | 10/2003 | Bowman-Amuah ...... 709/228 |
| 6,677,960 | B1 * | 1/2004 | Dew et al. ................ 715/714 |
| 2001/0034558 | A1 * | 10/2001 | Hoskins .................. 700/13 |
| 2002/0184349 | A1 * | 12/2002 | Manukyan ............... 709/221 |
| 2003/0072451 | A1 * | 4/2003 | Pimentel et al. ......... 380/270 |
| 2003/0177161 | A1 * | 9/2003 | Rothschild .............. 709/100 |
| 2005/0240924 | A1 * | 10/2005 | Jones et al. ............. 718/100 |
| 2005/0246269 | A1 * | 11/2005 | Smith ..................... 705/39 |

OTHER PUBLICATIONS

Oracle® EDI Gateway User's Guide, Release 11, Mar. 1998, ORACLE®.*
Oracle® Applications System Administrator's Guide, Release 11, Mar. 1998, ORACLE®.*

* cited by examiner

*Primary Examiner* — Kuen S Lu
(74) *Attorney, Agent, or Firm* — Priest & Goldstein, PLLC

(57) ABSTRACT

A scalable fulfillment system is presented that supports business processes, manages the transport and processing of business-related messages or documents between a business entity and clients, such as customers, vendors, and business partners, and generally supports business document processing. The system intelligently manages the transportation of files from clients, through processing of files, to generating responses that return to the clients. To accommodate a heterogeneous interfacing and processing with different clients in a central system, a file normalization technique is used that captures a common meta-data format from the numerous heterogeneous file types used by numerous clients. The meta-data files, also referred to as messages, contain links to their associated data files and are processed separately. Once the messages are entered into the system, an intelligent queue scheduler (IQS) is used to schedule the processing of messages across a scalable resource of processing engines based on normalized file meta-data parameters.

9 Claims, 11 Drawing Sheets

METHOD AND APPARATUS FOR SCALABLE TRANSPORT PROCESSING FULFILLMENT SYSTEM

FIELD OF THE INVENTION

The present invention relates generally to improved systems and methods for the transportation and processing of data files in a business to business environment. More specifically, the present invention relates to advantageous aspects of scalable fulfillment systems, intelligent job scheduling methods, and file normalization techniques for representing and processing heterogeneous files.

BACKGROUND OF THE INVENTION

A fulfillment system generally is a complex business system that supports business processes and enables a business to respond to business-related messages from individuals and other businesses. Many businesses today use inefficient fulfillment systems based on a wide variety of different and disparate internal processing systems and must interface with a multitude of business partners, who may also be using a wide variety of different and disparate systems. In today's highly competitive marketplace, having an inefficient fulfillment system within a supply chain infrastructure can lead to higher operating costs and less competitive operations, as well as numerous other problems. For example, in these inefficient fulfillment systems, there typically are no comprehensive ways to track and monitor files as they enter, move within, and leave the business, leading to situations where files and products can easily be lost. A fulfillment system based on different and disparate systems would typically have erratic and unpredictable performance, be difficult to make changes to, such as adding new file types and interfaces, and potentially have poor reliability.

SUMMARY OF THE INVENTION

With large global businesses having distributed stores, warehouses, and services, the present invention recognizes that having an efficient business fulfillment system is becoming increasingly important for efficient operations. To achieve efficient operations, there are many attributes a fulfillment system needs to possess. For example, the ability to interface with disparate systems, and, in general, accommodate existing heterogeneous file types and interfaces in an efficient, reliable, and secure manner is required. To minimize obsolescence, a fulfillment system should have some method to accommodate changes and updates, for example, to support new file types and interfaces, while minimizing code rewriting and supporting manpower. Further, the fulfillment system should be scalable to accommodate business growth, changes in suppliers and providers, and needs for improved performance even as the system expands in capacity. Ease of use in prioritizing files, and the vendors they represent, monitoring and tracking files as they enter, move within, and leave the system, and profiling the system for various business attributes, such as response time, are additional characteristics a fulfillment system needs to possess. For a majority of businesses, these are difficult attributes to obtain in a single comprehensive system.

To the ends of addressing such issues, the present invention provides an advantageous fulfillment system that supports business processes, manages the transport and processing of business-related messages or documents between a business entity and clients, such as customers, vendors, and business partners, and generally supports business document processing. A business-related message or document may be, for example, a purchase order for a product or a part, it may be a request for information of a technical, financial, marketing, operational, or service nature, it may be messages and documents related to the support of business needs such as inventory control, order fulfillment, or the like. This expanded view of a fulfillment system as referenced in the present invention is a single comprehensive system that addresses problems such as those described above. To resolve the above stated problems, the system intelligently manages the transportation of files from clients, through processing of files, to generating responses that return to the clients. Since the system supports a potentially large number of clients worldwide, a wide variation can be expected in file types, interfaces supported, business processes to follow, response mechanisms, quality of service requirements, and the like. To accommodate this heterogeneous interfacing and processing in a central system, the present invention advantageously uses a file normalization technique that captures a common meta-data format from the numerous heterogeneous file types used by numerous clients. The meta-data files, termed messages, contain links to their associated data files and are processed separately. Once the messages are entered into the system, an intelligent queue scheduler (IQS) is advantageously used to schedule the processing of messages across a scalable resource of processing engines based on normalized file meta-data parameters. The IQS also supports serial processing file requirements in a parallel processing environment.

According to another aspect of the present invention, the IQS in conjunction with processing daemons implement a dynamic queue that supports initial message entry and prioritization of messages within the IQS queue during the life cycle processing of a message. The processing daemons dynamically provide processing status, timestamps, message type information, client information and other similar information that can be used by the IQS in prioritizing processing steps. Message and file processing is advantageously partitioned in a series of separate action code modules, termed actions herein, that can be programmatically selected and sequenced in a desired processing pipelined order.

By using an advantageous multi-pass action interfacing method, new actions can be defined and allowed to be pluggable in the system for processing new message types and adding new clients with possibly unique file types and interfaces. The ability to define new actions and define a programmable sequence of actions allows new capabilities of document processing as the system evolves. The processing of the normalized heterogeneous files is also advantageously supported by a monitoring subsystem, including a user interface dashboard, that allows data files, messages, and processes to be viewed across the system at their various system states and time stamps creating a repository of information for tracking, failure recovery, power off recovery, and future development purposes.

A more complete understanding of the present invention, as well as other features and advantages of the invention, will be apparent from the following detailed description and the accompanying drawings.

DETAILED DESCRIPTION

Figure 1:
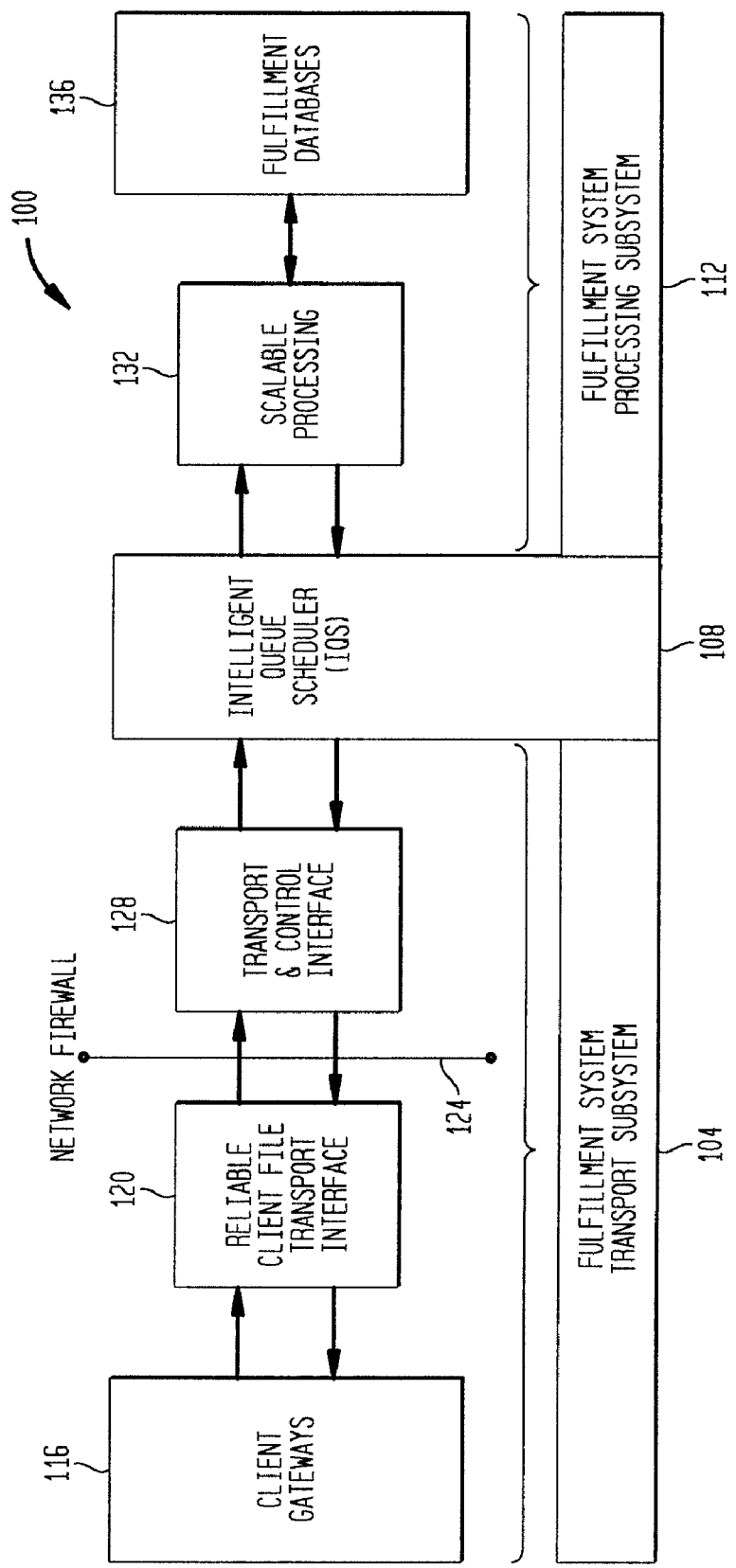
FIG. 1 illustrates a high level system view of an embodiment of a fulfillment system in accordance with the present invention.

The present invention addresses various aspects of an improved fulfillment system that manages the transport and processing of business-related messages and documents between online retailers, such as Wal-Mart.com, and clients, such as customers, vendors, and business partners. In one embodiment, a single comprehensive system is provided that addresses the problems described above. The fulfillment system is briefly described at a high level to provide context. This high level discussion is followed by further detailed descriptions of various aspects of the invention.

A client typically interfaces with an online retailer, such as Wal-Mart.com, through a reliable and secure gateway interface to the fulfillment system. Multiple gateways can be added and accommodated with different network security settings, including firewall rules, for example, as well as support for different quality of service requirements for different clients. In the incoming transport processes, the system examines client interface directories for files and captures any available meta-data, which describes attributes of the file, for example, file source client name, file type, time stamp, and the like, and stores the file data and associated meta-data on a reliable interface server. The meta-data, as uniquely used in the system of the invention, represents an example of a file normalization technique that supports numerous heterogeneous file types from numerous clients. Files found on the reliable interface server are pulled into the fulfillment system, with each file's meta-data or message separated from but linked to the file data. The message, along with a global identification (id) number, is then placed in an intelligent queue subsystem (IQS) for further processing while the file data is stored in a backing store. In the processing and outgoing transport processes, the present system supports different file formats that are pluggable as described in further detail below.

Once a data file and associated meta-data enter the internal system for processing, the meta-data is treated as a message which, according to the client, file type, direction, and other attributes, such as a time stamp, requires processing in a manner that supports programmable variation in processing steps and consistent processing within those steps for all messages requiring the same steps. Further, interdependencies between messages must be accommodated, such as may be required for inventory control messages which are a class of messages which must be processed in a particular order. The present invention provides these capabilities by structuring the message processing in a series of programmable action code modules (actions), similar, as it were, to having connectable standard processing functions, such that various programmable pipeline sequences and preprocessing steps can be obtained by appropriately ordering the actions. By using a set of action interfacing methods, new actions can be defined and allowed to be pluggable in the system for processing new message types and adding new clients with possibly unique file types and interfaces. The ability to define new actions and define a programmable sequence of actions allows new capabilities of message processing as the system evolves.

In support of numerous message types and processing functions, processing engines, which execute actions, are scheduled from a scalable resource of processors that can act independently in parallel or serially to accommodate dependencies between message types. To provide a scalable resource pool of processors and support the programmable action processing, a central IQS is used to schedule messages for processing based on a message's meta-data, including for example, file source client name, file type, direction, time stamp and the like. Since the action processors are treated as a resource pool of processors, any number of processors can be used, depending upon available resources, dynamically balanced for processing needs, and scaled in capability and capacity for the processing of messages provided by the IQS.

A monitoring subsystem, including a user interface dashboard, provides a view of data files, messages, processes and their various states, for example, time stamped action status of messages, within the system creating a repository of information for tracking and future development purposes. By committing and confirming the status of a message at every step in the system flow, reliable message processing can be obtained without loss of files and messages and their processing status even in the event of a power off situation or catastrophic failure. Upon restart, processing can resume based on the logged files and stored processing states.

Turning to the figures, various aspects of a presently preferred embodiment of a fulfillment system in accordance with the invention are described in further detail. Beginning with FIG. 1, a high level system view of a fulfillment system 100 is illustrated. The fulfillment system 100 is made up of three main parts, a transport subsystem 104, an intelligent queue subsystem 108, and a processing subsystem 112. The transport subsystem 104 consists of client gateways 116, a reliable client file transport interface 120, network firewall 124, and a transport and control interface 128. The fulfillment system transport subsystem 104 is responsible for the receipt and transmission of files. The intelligent queue subsystem 108 is an intelligent interface that joins the transport subsystem 104 with the processing subsystem 112. The processing subsystem 112 consists of a scalable processing subsystem 132 and fulfillment databases 136.

Figure 2:
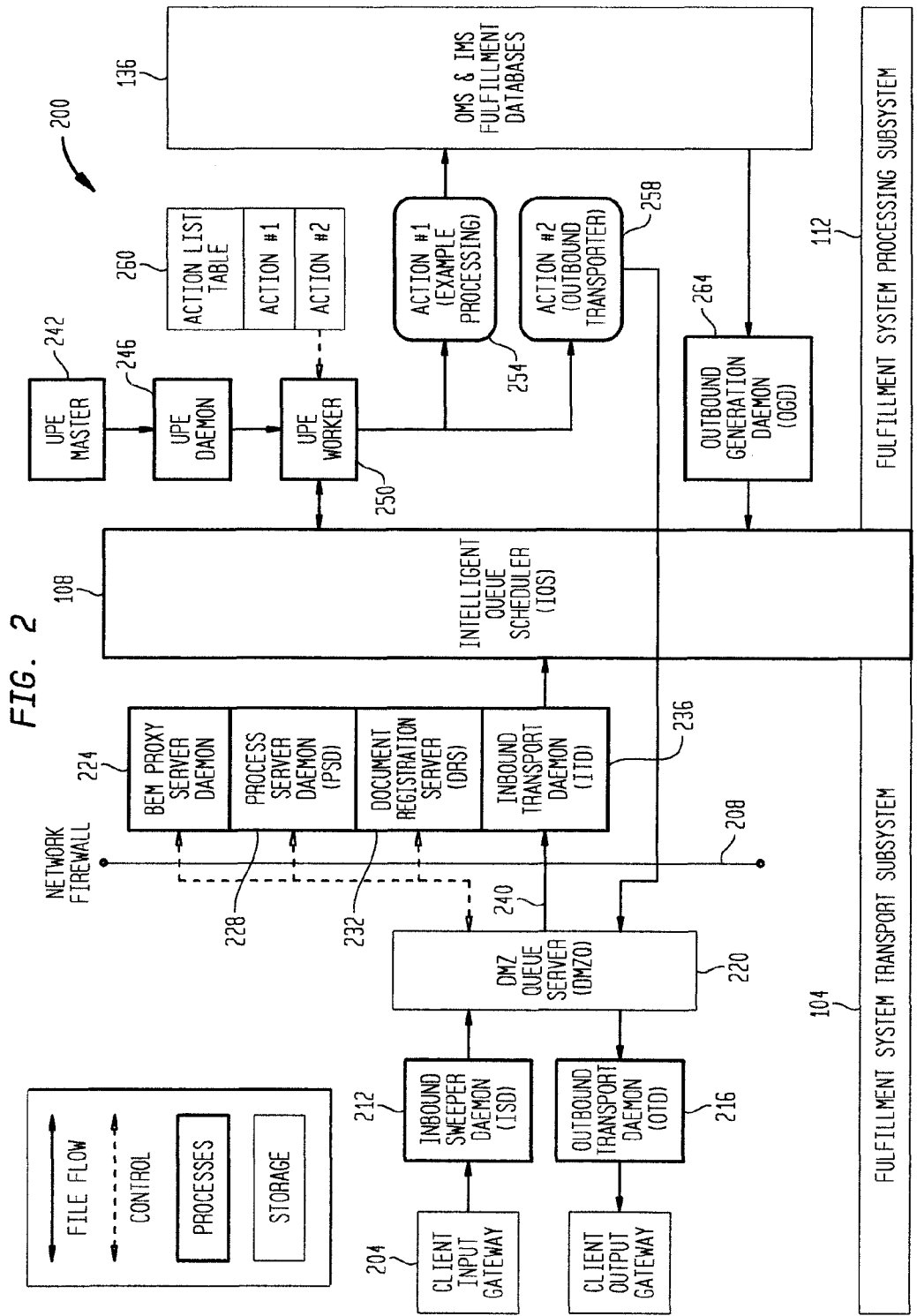
FIG. 2 illustrates a more detailed exemplary view of the fulfillment system of FIG. 1 in accordance with the present invention.

FIG. 2 illustrates a more detailed view of the exemplary fulfillment system 100 of FIG. 1. In FIG. 2 input gateway devices, also called gateways, such as client input gateway 204, are responsible for receiving files from clients outside the network firewall 208. Gateways may also reside inside the firewall protected system, not shown for reasons of clarity of illustration, for approved internal clients. The transport subsystem 104 has two layers of processing functions that are used to communicate with gateways and the internal system.

The first layer resides in a demilitarized zone (DMZ) which is a neutral zone between the firewall 208 protected internal system and the external client gateways. The DMZ consists primarily of two daemon processes, inbound sweeper daemon (ISD) 212 and outbound transport daemon (OTD) 216, and a reliable message queuing system, DMZ queue server (DMZQ) 220, such as an IBM MQ series server, to communicate with the internal system. These daemon processes begin transport processing primarily when a message or file transport event occurs and can push/pull messages on local queues on the DMZQ 220 only.

The second layer of the transport subsystem 104 consists of a business event message (BEM) proxy server daemon 224, process server daemon (PSD) 228, document registration server (DRS) 232, and inbound transport daemon (ITD) 236, that reside on the system side of the firewall 208. The BEM proxy server daemon collects event messages originated from servers or services in the DMZ and saves them to a central event database. The process server daemon (PSD) 228 is a daemon process running behind the firewall 208 to provide process registration for processes running in the DMZ. Since the DMZ has security constraints whereby there can be no direct access to databases behind the firewall, the PSD 228 provides a bridge function and facilitates communication of process related services to the database behind the firewall. System processes are registered and tracked to create a reliable system that can be restarted at registered points after any event which may have interrupted processing, such as a power loss situation. To provided a managed shutdown, each process also periodically reports its heartbeat information and checks for any shutdown or kill request. The information tracked for each process may suitably include id, type, startup time, last reported time, status, such as, running, kill requested, kill in progress, killed, shutdown requested, shutdown in progress, shutdown, and the like.

For security reasons, for an incoming file or message to cross the firewall 208, it must be pulled by the ITD 236. The ITD 236 accesses the local queues on the DMZQ 220 remotely from the internal network. This arrangement satisfies a security requirement that all communications to and from the DMZ originate from the internal network, and that any inbound communications destined for the internal processing subsystem are pulled from the DMZ rather than pushed from external gateways or from the DMZ.

Specifically, client files come into directories on a gateway that are then examined by an inbound sweeper daemon 212 to begin processing of any newly arrived files. Each file is run through a configurable program to make sure that it is ready to be sent to the internal processing subsystem. For example, the file may be checked to confirm that it is a complete file that was transferred in its entirety without errors that would question the validity of the data, before allowing the file to enter the fulfillment system. A client gateway device may connect to via the internet to the fulfillment system as a path for client messages or documents for order fulfillment, document processing, or the like. The inbound sweeper daemon 212 captures available meta-information, such as file source client name, file type, size, and the like, and the file and meta-data are placed on a DMZ queue. It is noted that each gateway directory is to be handled by one and only one daemon process to avoid file contention, though any number of daemon processes may reside on a single machine to process multiple sets of gateway directories.

The ITD 236 polls the DMZQ 220 and when a file and meta-data message is available dequeues it as the beginning of a transaction to transfer the message to the internal job scheduling queue. The ITD 236 then "pulls" the incoming file into an internal file store using secure file transfer protocol (SFTP) over SFTP interface 240. The documents registration server (DRS) 232 assigns a global file identifier to each file. Global file ids are used for logging, tracking, and to specify processing operations associated with each file within the whole of the fulfillment system. The files pulled into the system include the file's meta-data or message that is, in many cases, separated from but linked to the file data. After the files are registered, the ITD 236 then updates a file status indicating a time stamp and the present state of the file and the meta-data or message along with its global file id is placed in an intelligent queue in the IQS 108 while the file data is stored in a backing store.

An intelligent queue in the IQS is referenced by a queue id and specified to handle a maximum number of messages at any one time. This intelligent queue also has a serial/parallel processing flag and a description in an IQS types table. The serial/parallel processing flag in the IQS types table notes message interdependencies for serial dequeuing or parallel independent dequeuing from that particular queue. In a serial queue, necessary for certain types of inventory processing, no message may be dequeued for processing if there exists a message in front of it that has not been successfully processed, is being processed, or has failed to process completely. Any message that fails to process successfully will halt the queue and any messages in that queue that are behind it. Messages in a parallel queue do not have this restriction, allowing any or all messages in the queue to be processed at the same time, though messages in a parallel queue are typically dequeued in the order in which they were enqueued in FIFO fashion. Queues have a status associated with them and can either be enable or disabled dynamically. If a situation arises, as it often does in fulfillment processing, where certain processing steps need to be stopped, a queue can be disabled and then re-enabled later to resume processing.

As noted above, an incoming file, as represented by its associated meta-data message, is considered enqueued in the IQS 108 work queue when the meta-data message is enqueued. The system does not require a particular backing store file system, but rather assumes a file store of some kind is used where data and their associated messages with an attached global id can be read or written. This arrangement separates the backing store layer and data file transport from the message flow and allows the flexibility to substitute any type of file store underneath the IQS and processing subsystem.

The intelligent queue scheduler (IQS) 108 is backed by an Oracle database to manage all queue and message meta information and a local backing store file system that is shared with IQS software clients. More specifically, the IQS is an abstraction of a queue which supports dequeueing following a prioritization scheme based on, for example, a time stamp. Since each message has a unique id assigned to it, a message can be accessed in a read-only fashion, or popped off of the queue as a job to be processed. A message can be retrieved in a read-only fashion whereby the message status and attribute information remains unchanged. This approach is useful for viewing a message. By contrast, the action of popping a message off a queue essentially changes the message status and possibly some attribute information associated with the message, such as a time stamp. For example, for a processing engine to obtain the next available message, it would query the IQS and pop off the next available message. The processing engine then changes the status of the message, for example, from ACTIVE status to PROCESSING status, thus preventing the same message from being processed concurrently by another process. Each message also contains a pointer, which can be empty, to the backing data storage so that the data associated with a message is not sent to the Oracle database but can be accessed if required. When enqueuing a message, the client can specify the id of another message as a dependency that must process successfully before the enqueued message can be dequeued for processing.

The fulfillment system processing subsystem 112 consists of a scalable resource pool of processing engines to support a universal processing engine (UPE) subsystem including a UPE master process (UPE Master) 242, UPE Daemon 246, and UPE Worker 250, and access to fulfillment databases 136. The IQS provides queue management and prevents race conditions and message contention by assigning first message (if any) available in any of the listed queues, obeying all noted serial and dependency requirements. Message assignment and concurrency control are done within the IQS. Software clients, such as UPE daemons wishing to dequeue and analyze certain types of messages in the IQS system, may provide a list of message types in which they are interested to the IQS before getting the first available message from IQS. Different entities such as queues, message types, and client sources can have different levels of control as necessary, such as temporarily disabling particular client through control of the client's associated status.

The UPE subsystem is designed to handle all the processing of a message in a modular, reliable, and scalable manner. The UPE subsystem processing is modular, since each step of processing is performed by an independent action module, such as action #1 254 and action #2 258 of FIG. 2, each coded to process only its specific task. Also, the actions themselves are controlled by an action list table, such as action list table 260, that contains a consolidated set of business actions, that are appropriate for the message being processed. The UPE subsystem processing is reliable, since a processing engine executes a consolidated set of tasks in a deterministic, monitored, and logged manner. The UPE workers, such as UPE worker 250, are monitored by UPE daemons, such as UPE daemon 246, that will take appropriate action if a UPE worker experiences a failure. In connection with the processing of the files, a processing trail is created by time stamping each process and indicating a process status such that file processing can be resumed after an interruption. The UPE subsystem is scalable, since the intelligence in the IQS 108 queueing system allows the UPE daemons and UPE workers to operate independently of each other as long as there are no serial dependencies. Hence, as many UPE subsystem processes as are needed to support a desired load can be deployed among multiple processing engines from a scalable resource pool of processors and the messages are consequently processed concurrently.

Figure 3:
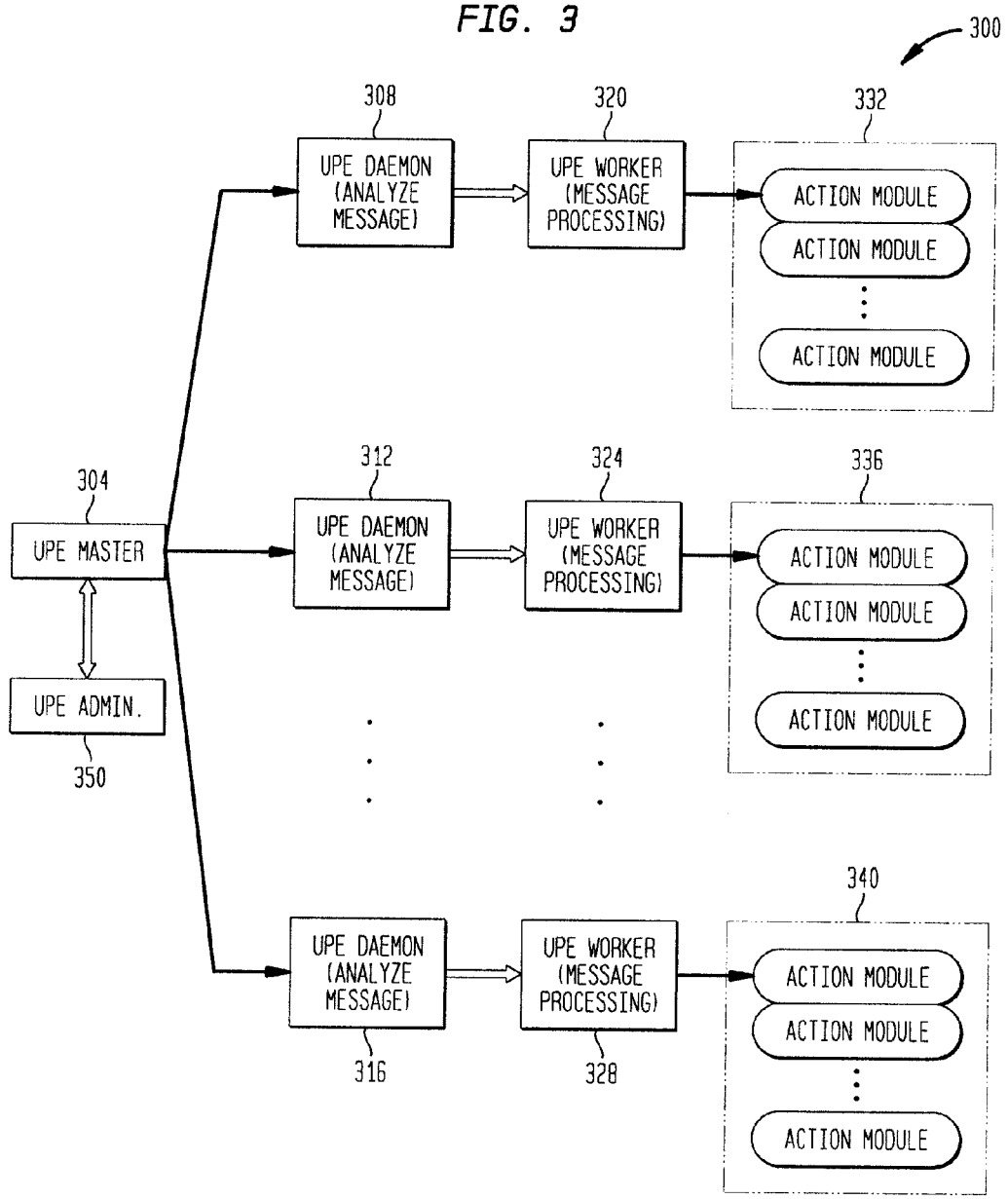
FIG. 3 illustrates various scalable aspects of a processing pool resource in accordance with the present invention.

FIG. 3 illustrates such a scalable concurrent multiprocessing system 300 including a UPE Master 304 that spawns multiple UPE daemons 308, 312, and 316 each spawning a UPE worker, 320, 324, and 328. Each UPE worker processes a set of action modules 332, 336, and 340. The UPE master 304 is monitored by a UPE administrative software client 350 that communicates with the UPE master 304 to initiate a graceful shutdown of the UPE subsystem. The UPE master 304 is responsible for the actual shutdown of the UPE subsystem. The UPE master 304 issues shutdown requests to all the UPE daemons, 308, 312, and 316, and each UPE daemon waits until its UPE worker has completed its assigned processing tasks before shutting down. Once all UPE daemons have completely shutdown, the UPE master exits and ends UPE subsystem processing.

Figure 4:
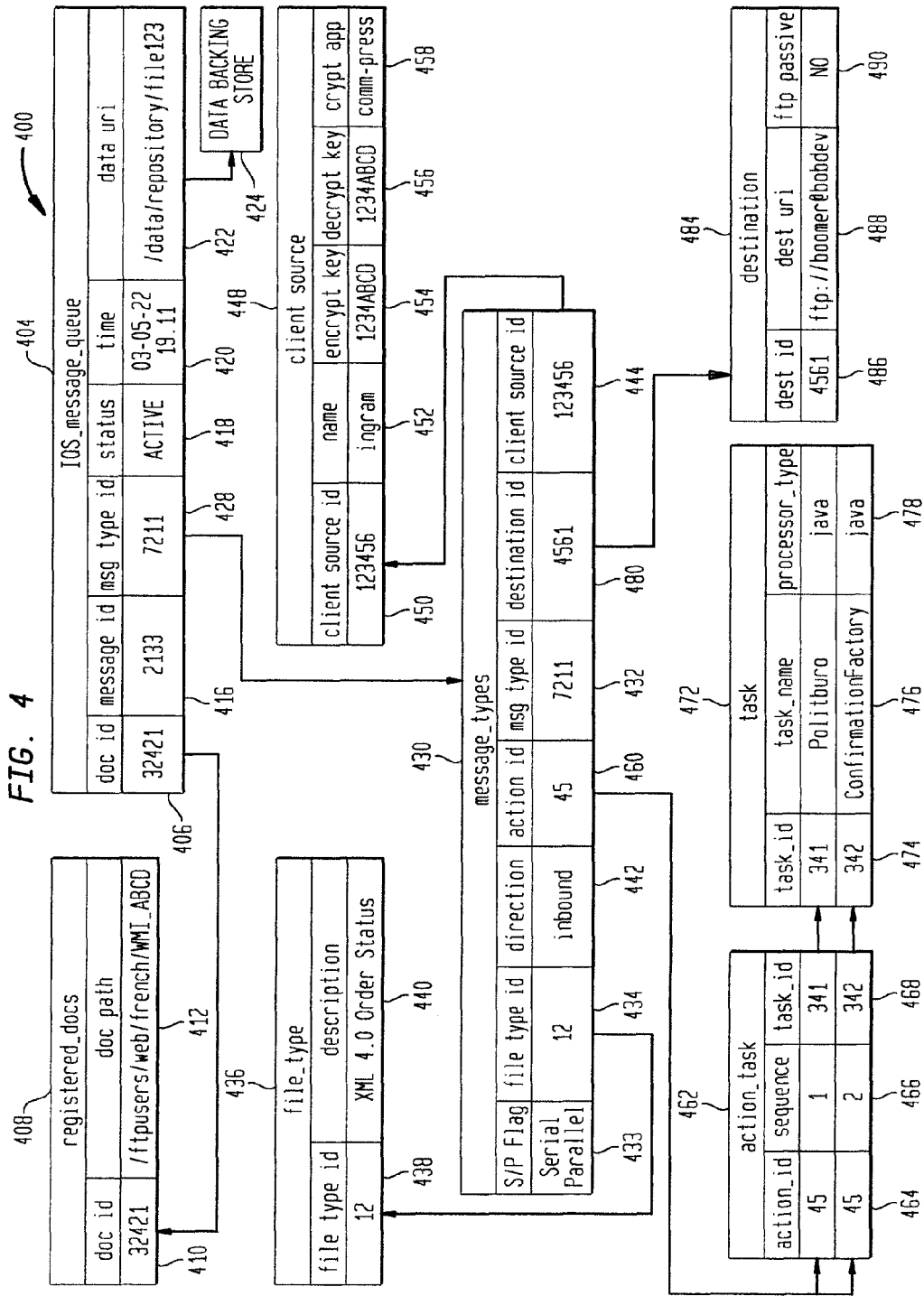
FIG. 4 illustrates an exemplary message structure in accordance with the present invention.

Supporting the heterogeneous fulfillment system is a file normalization technique based on a common message structure, such as an exemplary message structure 400 illustrated in FIG. 4. A message enqueued on the IQS has an IQS message queue identifier 404, labeled IQS_message_queue, that consists of a document id field 406 which is a link to a specific registered document identifier 408, labeled registered_docs, that contains a doc id link field 410, and a document access path 412 to a selected registered document. The IQS message queue identifier 404 also contains a message id field 416 that references this message on the IQS queue, a status field 418 indicating the present status of the message represented by IQS message queue id 404, and a time stamp 420 of when the message was enqueued on the IQS. An important aspect of the IQS message queue identifier 404 is a file data path 422 to the file data, associated with the message, located in backup storage 424. Also included is a message type field 428 that is a link to a message type identifier 430 containing the same message type identifier 432. The message type identifier 430 is a central reference for the incoming message as it contains the serial/parallel processing flag 433, a file type identifier field 434 that is a link to a descriptor 436 with the same file type id 438 and a description of the file type in description field 440. The message type identifier 430 also describes the message direction in direction field 442 and includes a client source id field 444, that is a link to a client source tag 448 with the same client source id 450. The client source tag 448 also contains a client source name 452, an encrypt key 454, a decrypt key 456, and a encryption/decryption application type field 458. The message type identifier 430 further contains an action id field 460 that is a link to an action task table 462 containing a list of action modules all with the same action id 464. The action task table 462 also contains sequence numbers 466 and task identifiers 468 that are links to specific action tasks. The action modules are referenced by a task tag 472 containing task ids 474, task names 476, and processor types 478 and their use is described in further detail below. The message type field 430 also provides a destination identifier field 480 for outbound files that is a link to a destination tag 484, with the same destination id 486, containing, for example, a destination path 488 and an indication of the file transport protocol passive mode status 490. Having this extensive message structure in place provides complete visibility, deterministic and reliable message processing, and enables a supporting tool, such as the user interface dashboard, to be used for system diagnostics, monitoring, and reporting.

Figure 5:
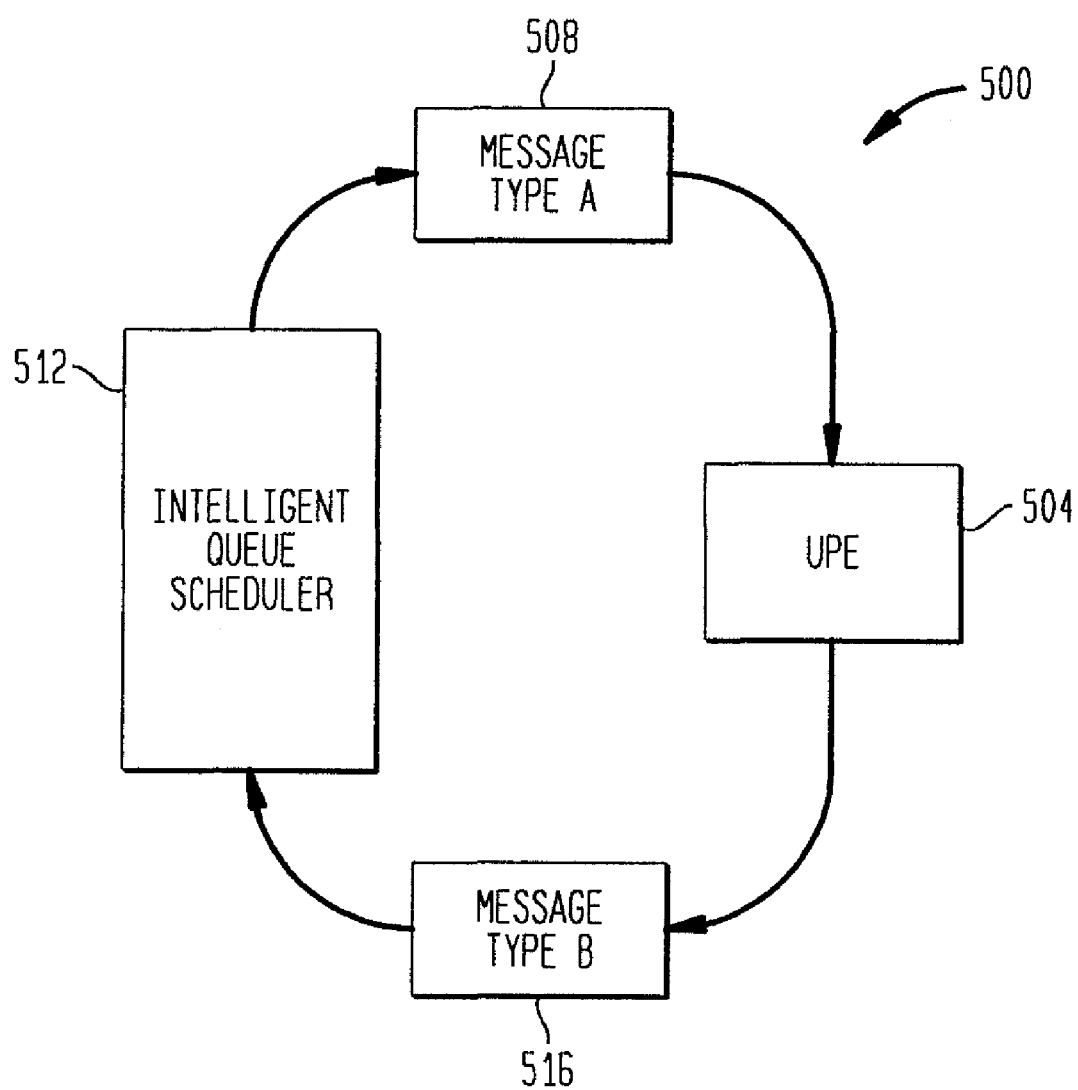
FIG. 5 illustrates an exemplary message process sequence in accordance with the present invention.

FIG. 5 illustrates an exemplary message process sequence 500 where a UPE subsystem 504 retrieves a message, for example, a message type A 508, from the IQS 512. The UPE subsystem 504 processes the type A message and transforms the same message to a different type, for example a message type B 516, and enqueues it on an IQS 512. This single pass process allows a message processing sequence, containing a large number of steps, to be partitioned into multiple separately processed steps such as performed by action modules 332 of FIG. 3. The individual action modules may be used for the processing of other messages, potentially processed in parallel, assuming no dependencies between actions, and programmatically ordered, thereby improving the performance of the fulfillment system in a scalable manner.

Figure 6:
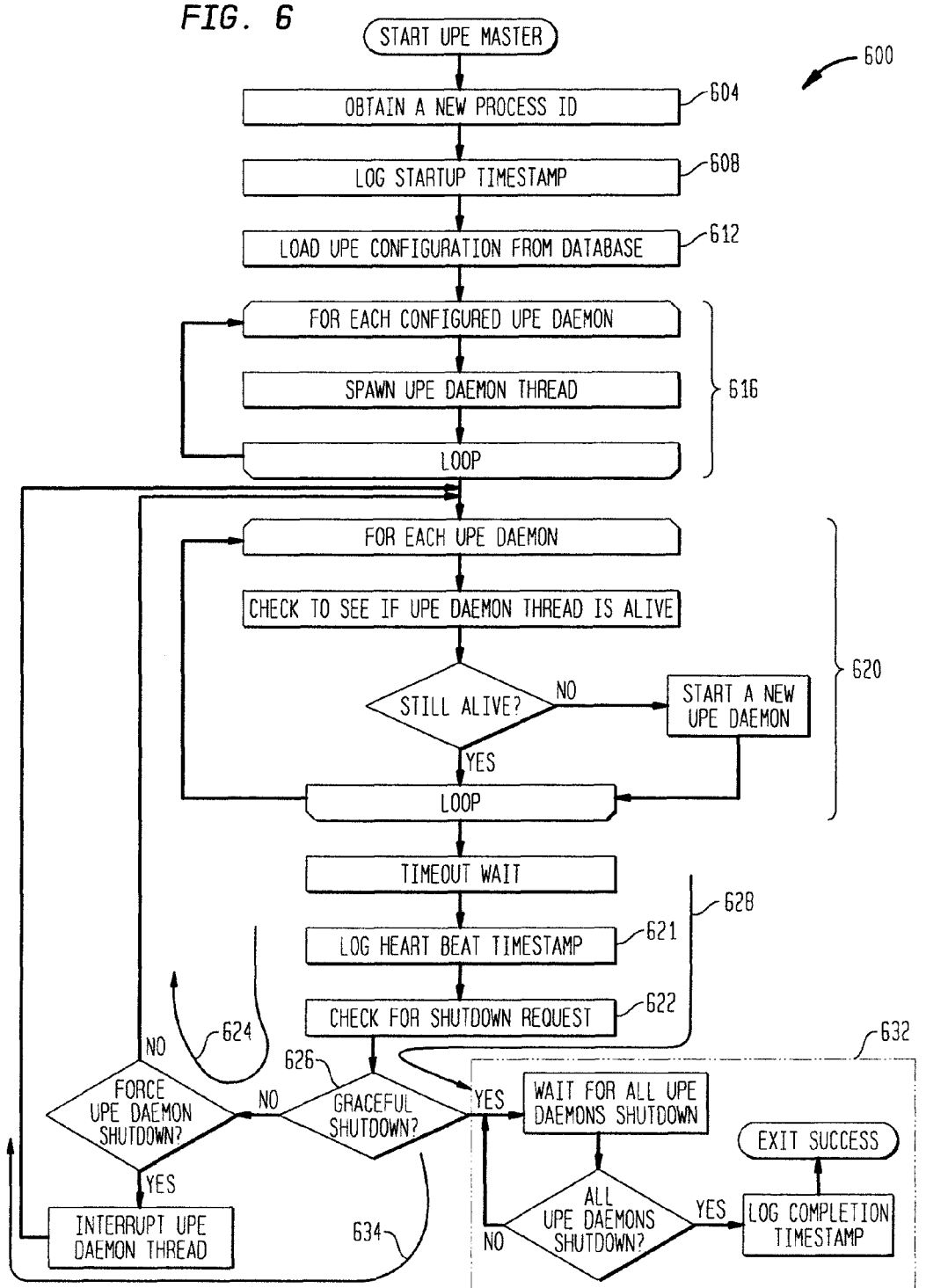
FIG. 6 illustrates an exemplary universal processing engine master process in accordance with the present invention.

Starting a UPE master, such as UPE master 242 of FIG. 2, initiates the UPE subsystem, consisting of, for example, UPE Daemon 246 and UPE Worker 250. In an exemplary UPE master process 600 shown in FIG. 6, the UPE master, once started, first obtains a process id in step 604, logs a time stamp in step 608 to indicate it was initiated, and reads in UPE configuration file in step 612. The UPE master then, according to the configuration file, dynamically spawns off multiple UPE daemons, as indicated by the process loop steps 616. Each UPE daemon monitors message queues and processes messages, including generating outbound fulfillment messages. The UPE master oversees the starting, running, and shutdown of UPE daemons, process loop steps 620. In addition, after logging a heartbeat timestamp, step 621, the UPE master also listens on TCP/IP network port for requests to gracefully bring down the UPE subsystem, step 622. With no shutdown request, the master process returns to the daemon overseeing task, process loop steps 620, following path 624. If there is a shutdown request, then it is determined if the request is for a graceful shutdown in step 626, meaning there is time to complete present processing functions and then shut down before bringing on new work. A graceful shutdown process waits until all started UPE daemons are shut down before logging a completion timestamp and exiting, in process steps 632 following path 628. If it is not a graceful shutdown, then the UPE daemons are interrupted to force a shutdown operation, following path 634. A UPE daemon, upon being interrupted for a shutdown request, acknowledges the interrupt and begins a forced shutdown process. The interrupt is asynchronous and non-blocking. Path 634 illustrates an example of a case when a UPE daemon is issued a forced shutdown request possibly due to a problem with its UPE worker. Process loop steps 620 monitor the status of the daemons and will restart a new one if necessary.

The UPE subsystem is configurable via a centralized configuration file. The configuration file contains configuration information necessary for fulfillment processing such as the number of UPE daemons that can be spawned, list of message queues to be processed, network port for outgoing messages, and other system specific operating information such as sleep intervals between event checks, and the like.

A UPE daemon is responsible for starting an out-of-process UPE worker to handle fulfillment functionality. UPE workers perform the actions required for a particular file type. A UPE Daemon that spawned a UPE Worker monitors the UPE Worker's execution including logging and making sure the worker doesn't die or hang.

Figure 7:
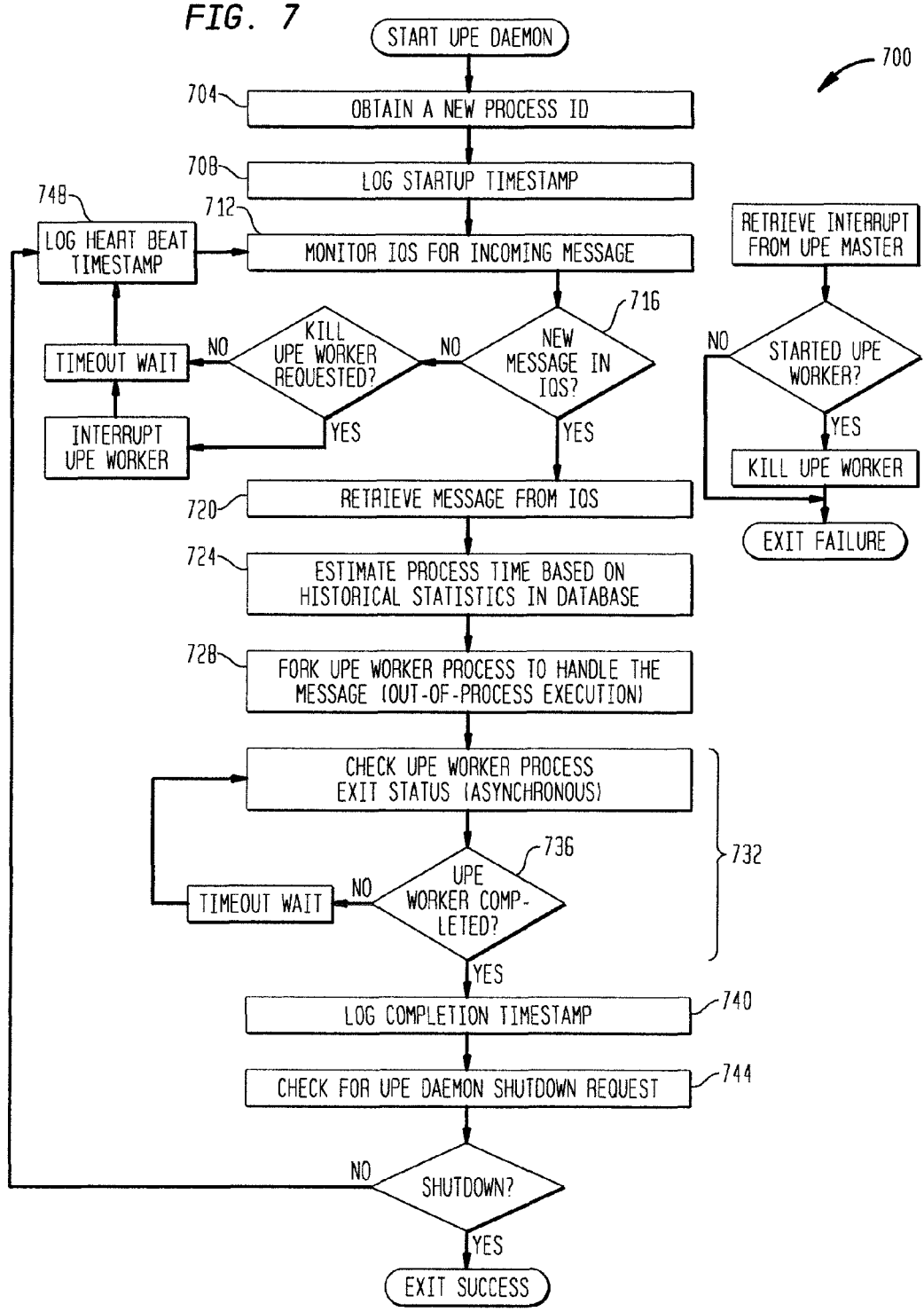
FIG. 7 illustrates an exemplary universal processing engine daemon message process in accordance with the present invention.

In an exemplary UPE daemon message process 700 shown in FIG. 7, each UPE daemon, upon starting, obtains a new process id in step 704, logs a startup timestamp in step 708, and then monitors the assigned set of message queues in the IQS for new messages in step 712. When the UPE daemon determines a new message has arrived in a message queue, step 716, it first retrieves the message from the IQS, step 720, obtains a message id from the message, and evaluates the message to estimate the process time based on historical statistics for past equivalent message processing, step 724. The UPE daemon then starts an out-of-process UPE worker as a parallel process, step 728, to handle the message and the UPE daemon waits for the UPE worker to complete its message processing, loop steps 732. The UPE daemon compares the UPE worker execution time against historically acceptable processing time to detect if the worker is hung.

Figure 8:
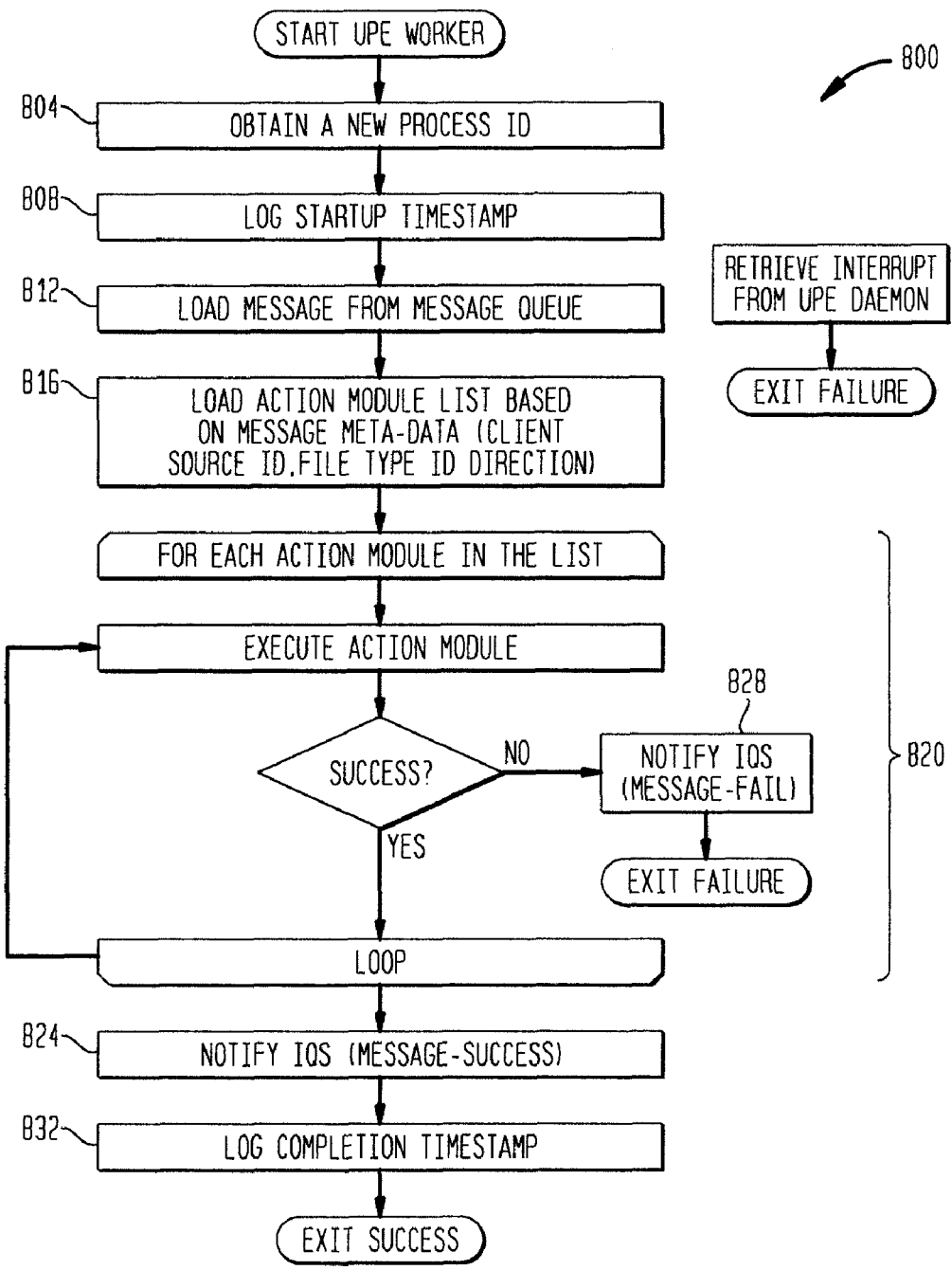
FIG. 8 illustrates an exemplary universal processing engine worker message process in accordance with the present invention.

In an exemplary UPE worker message process 800 illustrated in FIG. 8, once the UPE worker is started, the UPE worker obtains a new process id, step 804, logs a startup timestamp 808, and loads the message from the message queue, step 812. The UPE worker then loads a specified action module list from the fulfillment database, based on message meta-data including client source id, file type id, and file direction, in step 816. Next, the UPE worker then performs a set of actions, loop steps 820, based on the action list and updates the message status on successful completion of the action list, step 824, or on a failure situation, step 828. For tracking purposes, an action module may be required to report a heartbeat timestamp. It is also noted that the last action in the action list is usually to change the file type if further processing is required and reenqueue the new processing state message in the IQS. After successful completion of processing the action modules, a completion timestamp is stored, step 832, and the UPE Workers exits.

Once the UPE daemon receives the final status, step 736, it logs a completion timestamp, step 740, and checks to see if there is a shut down request in step 744. With no shutdown request, the UPE daemon logs a heart beat timestamp, step 748, and returns to monitor the assigned set of message queues for new messages, step 712, checking the IQS at a fixed preset time interval, path 752. By spawning the UPE daemons and UPE Workers as independent parallel processes, multiple UPE daemons and UPE workers can run concurrently to increase the throughput of the fulfillment message processing.

In outbound message generation, an outbound generation daemon (OGD) 264 of FIG. 2 queries the fulfillment databases to see if there are any outbound order files, such as order requests, order cancellation notices, and the like, waiting to be generated. If there are outbound files, the OGD 264 creates work ticket messages and enqueues them into the IQS 108. When a work ticket is processed by a UPE worker, the actual outbound file is generated and the associated message is enqueued into IQS 108 and scheduled to be processed and delivered to the intended client.

Outbound messages are sent directly by a UPE worker executing an outbound action module, such as Action #2 module 258 of FIG. 2, to the DMZ queue server (DMZQ) 220, such as an IBM MQ series server. An outbound transport daemon, such as OTD 216 of FIG. 2, of the DMZ monitors the DMZ queue for messages to be sent external to the fulfillment system. In such a case, a message from the internal network side of the firewall is packaged with information about its final destination and pushed from the internal network onto the DMZ queue. In more detail, a UPE worker, such as UPE worker 250, handles a single file with a known destination path and known destination queue. The UPE worker Action #2 module 258 repackages the outbound message to include the necessary meta information for the OTD to deliver the file. The Action #2 module 258 then pushes the repackaged message to the destination queue in the DMZQ 220 to be picked up by the DMZ outbound daemon process OTD 216. If successful, the UPE worker 250 returns with a success status and is reclaimed by the UPE daemon process. Otherwise, a failure is appropriately logged. The OTD 216 receives the outbound message and sends it, using a file transfer protocol (ftp) protocol, for example, to the specified client destination.

A message processing sequence is described next to further illustrate the UPE subsystem operations to process a message by use of the attributes of the message and the configurable action modules. There are three primary indicators in the message structure that are used to determine how to process a message. These three primary indicators are the client source id, the file type, for example XML 4.0 Order Status, and the direction, for example, inbound or outbound. A message type identifier, such as message type identifier 430 of FIG. 4, contains the client source id 444, message type 432, file type 434, and directions 442 and has an action id 460 that is a link to an action task table 462. For example, Table 1 below includes the type of action list that is appropriate for an exemplary set of <client source id, file type, direction> tuple.

Figure 9:
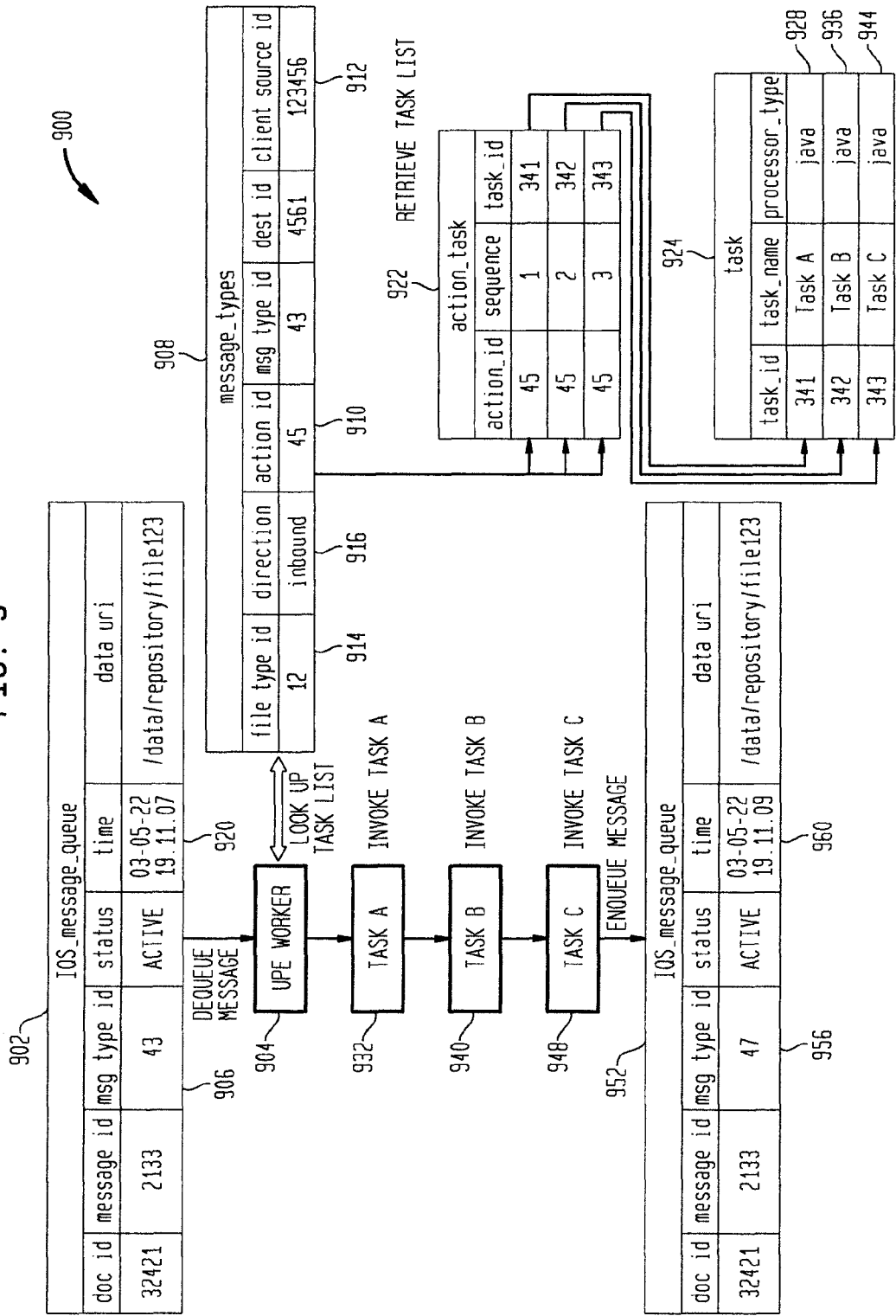
FIG. 9 illustrates an exemplary message process sequence with multiple actions and links, evaluated using the message structure of the invention, and processed by a universal processing engine (UPE) subsystem in accordance with the present invention.

FIG. 9 illustrates an exemplary message process control sequence 900 with multiple actions, evaluated using a message structure in accordance with the present invention, and processed by a UPE subsystem. Specifically, a next available message to be processed is provided by an IQS, such as IQS 108 of FIG. 2, as indicated by IQS message queue identifier 902. A UPE worker 904, assigned this task by a UPE daemon, loads the message from the message queue in the IQS and then loads the specified action module list. The IQS message queue identifier 902 contains a message type id 906 which is a link to a message type identifier 908 that contains an action id 910 based on the client source id 912, file type 914 and direction 916. The IQS message queue identifier 902 also contains a timestamp 920. A startup timestamp is logged by the UPE worker at the beginning of processing the message.

TABLE 1

<client source id, file type, direction> Tuple → action list

| client source id | file type | direction | action list |
|---|---|---|---|
| 1234 | Raw | inbound | Typer Module |
| 1234 | Compressed | inbound | Decompression Module |
| 1234 | Uncompressed | inbound | Typer Module |
| 1234 | EDI Order Status | inbound | Universal Translator Module |
| 1234 | XML 4.0 Order Status | inbound | Politburo Module |
| 1234 | XML 4.0 Error | outbound | Universal Translator Module |
| 1234 | EDI Error | outbound | Outbound Transport Module |
| | . . . and so on . . . | | |

The action id 910 contains a link to the action task table 922 which contains a sequence of action tasks to be processed. The UPE worker 904 invokes the first task from the task tags 924, task A 928, and processes task A 932. Since the action task table contains three tasks to be processed, the UPE worker proceeds to invoke the second task, task B 936, and processes task B 940. The UPE worker continues and invokes the third task, task C 944, and processes task C 948. In this example, task C 948 is the final task in the task table so the message is enqueued in the IQS with a new IQS message queue identifier 952 containing a new message type id 956 and an updated time stamp 960. A processing task can include, for example, decompression functions, file type identifier functions, translation functions, outbound message transport functions, creating a brand new message, change the type of this message, or the like. By using the mechanism of the action task table, new action tasks can be created to support, for example, new file formats and new interfaces, and then plugged into a processing sequence as required.

Figure 10:
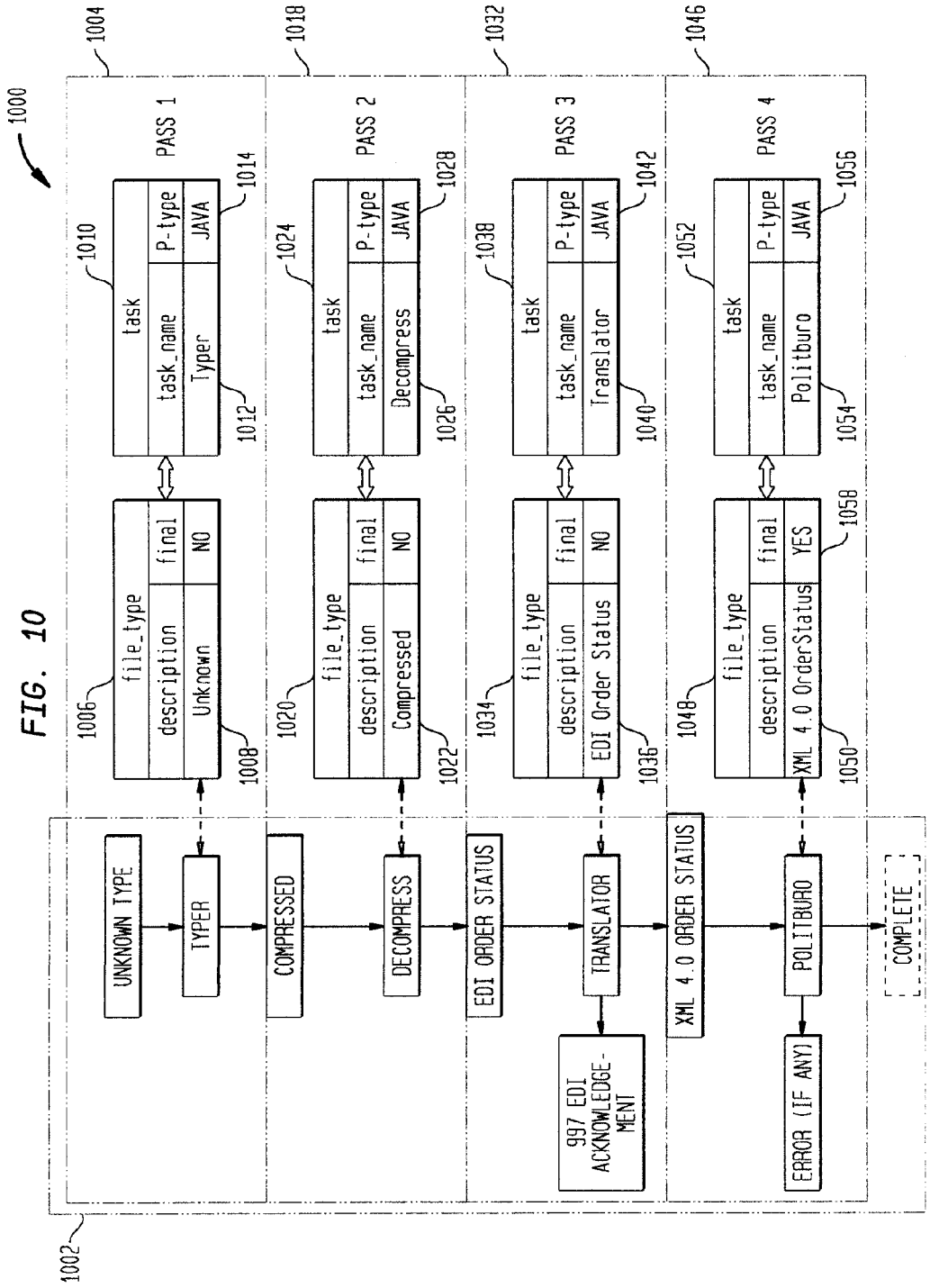
FIG. 10 illustrates an exemplary life cycle of a message in accordance with the present invention.

FIG. 10 illustrates an exemplary life cycle 1000 of a message. In this example, an inbound, compressed, electronic data interchange (EDI) Order Status file is processed through the fulfillment system and contains references to the fulfillment system 200 of FIG. 2 and the exemplary life cycle 1000 of FIG. 10. The life cycle includes multiple cycles through the execution flow of the UPE subsystem as the message proceeds through the UPE subsystem as indicated by the high level process steps 1002.

The process begins with the inbound sweeper daemon 212 in the DMZ that finds a new file and enqueues it as a message onto its local DMZ queue 220. The inbound transport daemon 236 takes the message from the DMZ queue 220 and enqueues it onto the internal IQS 108 with file type specified as "raw" or unknown. A UPE daemon, such as UPE daemon 246, is activated and finds a message on the queue in the IQS 108 and spawns a UPE worker, such as UPE worker 250, passing the message id to it via a command line argument. A pass 1 stage 1004 begins a typing process. The UPE worker dequeues the message from the IQS with a file type 1006 indicating an unknown file type 1008, and the linked task tag 1010 specifies it to invoke a typer action module 1012 which is a java processor type 1014. The execution of the typer module determines that the file is a "compressed" file type, and reenqueues the message onto the IQS with that type.

A pass 2 stage 1018 begins a decompression process. An available UPE worker dequeues the message from the IQS with a file type 1020 indicating a compressed file type 1022, and the linked task tag 1024 specifies it to invoke a decompression module 1026 which is a java processor type 1028. The execution of the decompression module decompresses the message, creating a new message with type "EDI Order Status", and enqueues the new message onto the IQS with that type.

A pass 3 stage 1032 begins an EDI-to-XML translation process. An available UPE worker dequeues the message from the IQS with a file type 1034 indicating EDI Order Status file type 1036, and the linked task tag 1038 specifies it to invoke the translator module 1040 which is a java processor type 1042. The execution of the translator module translates the message, creating a new message of type "XML 4.0 Order Status" and enqueues the new message onto the IQS with that type.

A pass 4 stage 1046 begins an XML and error reply process. An available UPE worker dequeues the message from the IQS with a file type 1048 indicating XML 4.0 OrderStatus 1050, and the linked task tag 1052 specifies it to invoke the politburo module 1054 which is a Java processor type 1056. The execution of the politburo module validates the message and processes it against an order management system (OMS) database. For the purposes of this example, this step is the final message processing step as indicated in the file type final field 1058 and an order status may be posted in the OMS, for example. Other possibilities, can include, for example, further processing passes to send an order status back to the requesting party, or generation of an error message if one was found.

Figure 11:
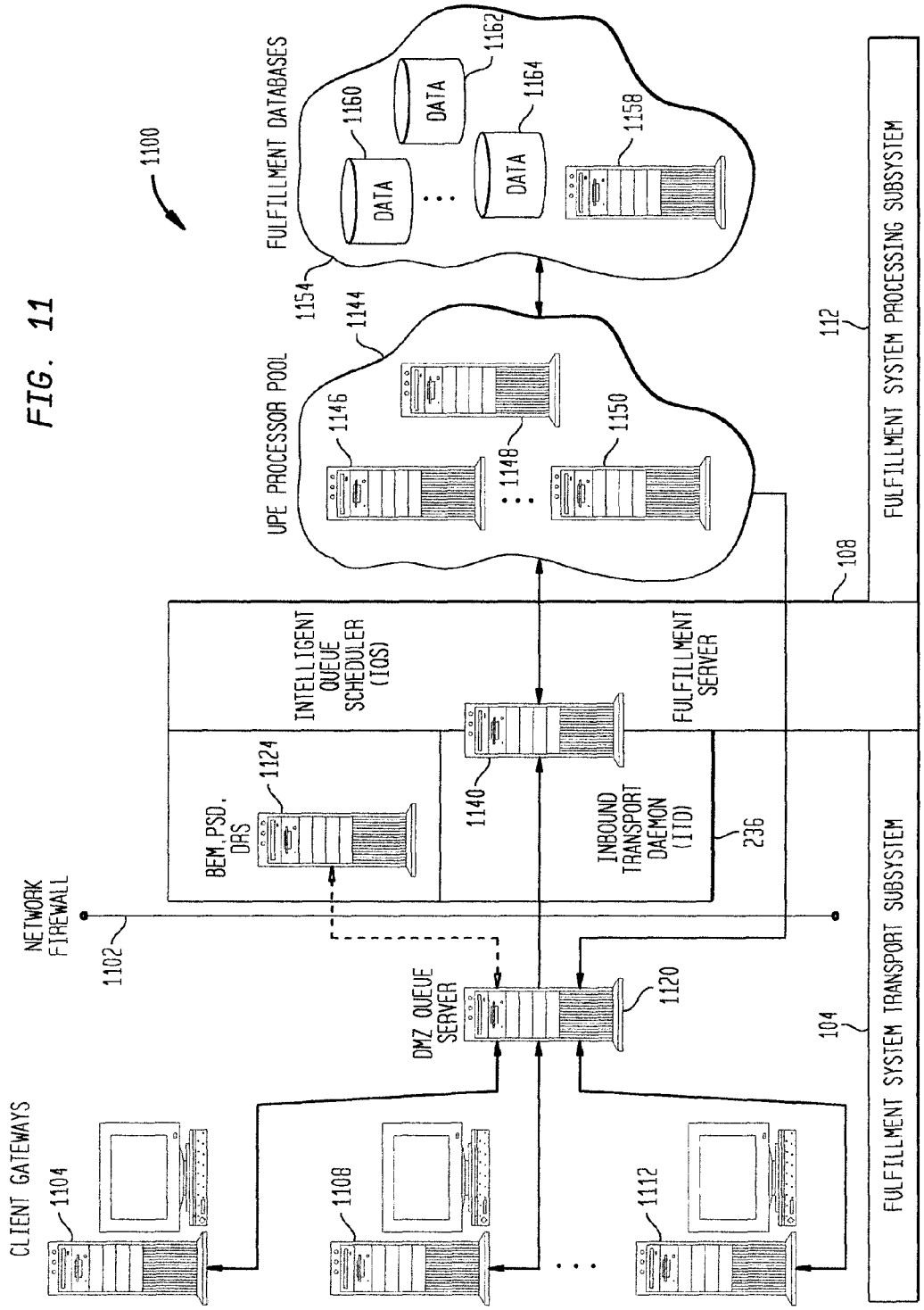
FIG. 11 illustrates an exemplary computer system suitable for use in implementing the fulfillment system of the present invention.

To support scalable and reliable fulfillment processing, an exemplary computer system 1100 is illustrated in FIG. 11. System 1100 is suitable for use by the fulfillment system of the invention. A medium readable medium stores contents which cause the computer system 1100 to perform the processing of heterogeneous files in a fulfillment system as described in further detail below. The computer system 1100 is partitioned into functional blocks associated with fulfillment system transport subsystem 104, IQS 108, and fulfillment system processing subsystem 112 as previously described above in reference to FIGS. 1, 2, and 3. The fulfillment system transport subsystem 104 includes, external to firewall 1102, client gateways 1104, 1108, and 1112. A DMZ queue server 1120 provides the inbound sweeper daemon (ISD) 212 and outbound transport daemon (OTD) 216 functions as well as a reliable and secure DMZ queue function 220. The fulfillment system transport subsystem 104 includes, internal to the firewall 1102, a support server 1124 or servers providing BEM proxy server daemon 224, process server daemon (PSD) 228, and document registration server (DRS) 232 functions. The IQS 108 and the ITD 236 functions reside on fulfillment server 1140. The fulfillment system processing subsystem 112 includes a scalable UPE processor pool 1144 containing multiple processors, such as processors 1146, 1148, and 1150. This UPE processor pool 1144 provides independent processor resources that can be activated for parallel UPE subsystem functions, such as, multiple parallel UPE daemons and multiple parallel UPE workers as illustrated in FIG. 3. The UPE processor pool may be a cluster processor, a multi-thread processor, or other parallel processor system.

The fulfillment system processing subsystem 112 also includes fulfillment databases 1154, such as an order management system (OMS), inventory management system (IMS), reporting databases, and the like. The data for these fulfillment databases 1154 resides on storage mediums such as disks or tapes 1160, 1162, and 1164 under the control of one or multiple database servers, such as database server 1158.

Computer system 1100 is disclosed herein in a form in which various system functions are performed by discrete computers. However, any one or more of these functions could equally well be realized, for example, in a different arrangement of one or more appropriately programmed processors. For example, in a low cost system, the UPE processor pool 1144 may be realized by a single server. In another example system, the BEM proxy server daemon 224, PSD 228, DRS 232, ITD 236, and IQS 108 processes may be operative on a single server.

While the present invention has been disclosed in a presently preferred context, it will be recognized that the present teachings may be adapted to a variety of contexts consistent with this disclosure and the claims that follow.

We claim:

1. A method for scalable processing of client messages in a fulfillment system, the method comprising:
    storing a set of action tasks in an action task table according to predefined types of client files, the action task table specifying links to the action tasks and a processing sequence;
    enqueueing a client message on a work scheduling queue, the client message containing a first set of meta-data and a second set of meta-data concerning a client file, the client file accessible on a backing store;
    dequeueing a client message according to a priority based upon the first set of meta-data information;
    selecting an action task from the action task table based on the second set of meta-data information and the processing sequence; and
    processing the dequeued client message according to the selected action task on an available process from a group of parallel processes, whereby the processing of the file stored in the backing store is separated from the message processing flow.

2. The method of claim 1 wherein processing the dequeued client message further comprises:
    updating the meta-data contained in the client message for a new message type and a timestamp; and
    enqueueing the updated client message on the work scheduling queue.

3. The method of claim 1 wherein the action tasks are each uniquely specified by a client source name, type of file, and direction of file processing.

4. The method of claim 1 wherein the first set of meta-data information comprises at least a timestamp.

5. The method of claim 1 wherein processing the dequeued message proceeds until the processing is successfully completed or fails and an indication is provided as to the success or failure of the processing so that if the processing is unsuccessful then an ordered procedure is followed to deal with the failure and provide information as to the extent that processing was successful.

6. The method of claim 1 wherein the second set of meta-data information comprises:
    a client source name;
    a flag;
    a type of file; and
    an indication of direction of file processing as either incoming or outgoing.

7. A scalable processing system for processing client files in an fulfillment system, the scalable processing system comprising:
    an intelligent queue scheduler for scheduling client messages enqueued on a work scheduling queue for processing where a client message comprises a first set of meta-data having a link to an associated client file separately stored in a backing store and a second set of meta-data having a client source name, file type, an indication of message direction as either incoming or outgoing, a link to a set of action tasks, and a flag;
    a scalable pool of processor resources providing a list of message types each associated with a selectable processor resource to the intelligent queue scheduler;
    individually selectable processor resources selected from the scalable pool of processor resources based on the message type for processing a first set of client messages in sequential order based on the flag indicating serial processing; and
    individually selectable processor resources selected from the scalable pool of processor resources based on the message type for simultaneously processing a second set of client messages in parallel based on the flag indicating parallel processing.

8. The scalable processing system of claim 7 further comprising:
    an action task table containing a link to at least a first action task and a link to a second action task both action tasks being required for the processing of a client message, each task identified according to predefined types of client files; and
    an available processor resource selected from the scalable pool of processor resources for processing the first action task first the said processing comprising updating the meta-data contained in the client message for a new message type and a time stamp; and
    the available processor resource enqueueing the update client message on the work scheduling queue.

9. The scalable processing system of claim 8 wherein the processing of the second action task completes the processing for the client message and provides an indication of success or failure of said processing.

* * * * *